US012705944B1

(12) United States Patent
Muir

(10) Patent No.: US 12,705,944 B1
(45) Date of Patent: Aug. 11, 2026

(54) MEDIA PROTECTION THROUGH MEDIA DEFORMATION

(71) Applicant: Cardtronics USA, Inc., Atlanta, GA (US)

(72) Inventor: Adam Jack Bela Muir, Edinburgh (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/203,364

(22) Filed: May 9, 2025

(51) Int. Cl.
*G07D 11/225* (2019.01)
*G07F 19/00* (2006.01)

(52) U.S. Cl.
CPC ......... *G07D 11/225* (2019.01); *G07F 19/205* (2013.01)

(58) Field of Classification Search
None
See application file for complete search history.

(56) References Cited

U.S. PATENT DOCUMENTS

2024/0233495 A1* 7/2024 Casimiro ............. G07D 11/125
2024/0309695 A1* 9/2024 Smith .................. G07D 11/125

* cited by examiner

*Primary Examiner* — Kristy A Haupt
(74) *Attorney, Agent, or Firm* — Schwegman Lundberg & Woessner, P.A.

(57) ABSTRACT

A media cassette includes a housing that stores media items and incorporates a security mechanism to protect against theft. The security mechanism includes a heating element positioned within the housing and a power source connected to the heating element. When unauthorized access is detected, the heating element activates to generate temperatures sufficient to damage the media items within the housing while remaining below temperatures that would damage the housing itself. The damaged media items become permanently deformed and fused together, rendering them unusable for transactions. The security mechanism operates automatically upon detection of potential theft attempts through various sensors.

20 Claims, 4 Drawing Sheets

MEDIA PROTECTION THROUGH MEDIA DEFORMATION

BACKGROUND

Automated teller machines (ATMs) and other media terminals that store and dispense cash remain prime targets for criminal attacks due to the high value of currency contained within them. While existing security measures like ink staining systems attempt to render stolen cash unusable by marking it with indelible ink, criminals have found ways to circumvent these protections through the use of various solvents that can clean the ink, particularly from polymer and coated notes. This limitation in current security approaches leaves financial institutions vulnerable to significant losses from successful ATM attacks.

DETAILED DESCRIPTION

Figure 1:
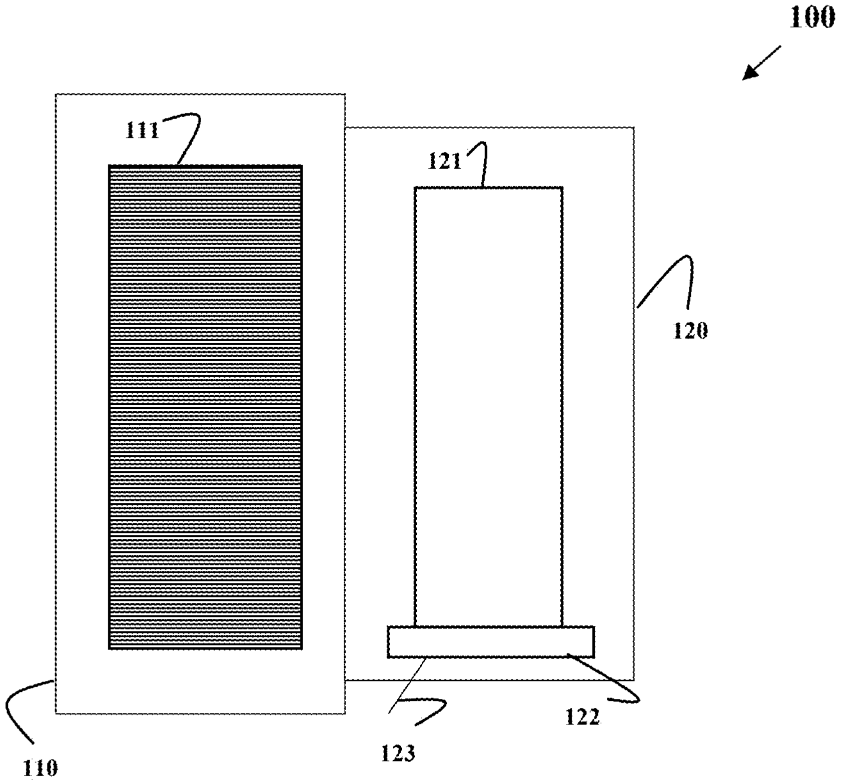
FIG. 1 is a diagram of a media cassette enabled with media deformation capabilities, according to an example embodiment.

Media terminals, particularly automated teller machines (ATMs), continue to face sophisticated attack methods from criminals seeking to steal the valuable currency stored within their secure housings. Traditional protection methods have relied heavily on ink staining systems to mark currency during theft attempts. However, these conventional approaches have shown vulnerabilities, particularly with modern polymer and coated banknotes, where determined criminals can use solvents to remove the protective inks and potentially salvage the stolen currency for illegal use.

The challenge of protecting stored media within terminals has become more complex with the introduction of polymer-based currency notes. While these notes offer enhanced durability and security features for normal use, their physical properties present both challenges and opportunities for protection against theft. Financial institutions require more robust solutions that can render stolen currency permanently unusable, rather than temporarily marked, to effectively deter criminal activities targeting their terminals.

In an embodiment, a media cassette incorporates a resistive heating wire within its lid structure, connected to a lithium-ion battery power source. The heating wire, when activated, can generate temperatures of approximately 180 degrees Celsius, well above the 120-degree threshold at which polymer notes begin to deform.

The technology discussed herein takes advantage of the inherent material properties of modern currency, specifically that polymer notes deform at temperatures significantly lower than the melting point of the cassette housing materials. In various embodiments, when sensors detect an unauthorized access attempt, the system applies 0.66 volts and 1.94 amps to approximately 40 centimeters of heating wire, achieving optimal operating temperature within 4 minutes. Upon cooling, the deformed notes fuse together, creating a permanently damaged mass of currency that cannot be separated or used for transactions.

In an embodiment, the PC/ABS (polycarbonate/acrylonitrile butadiene styrene) materials used in the cassette construction have a melting point above 200 degrees Celsius and a kindling point above 375 degrees Celsius, providing a wide safe operating range for the heating element to damage media items without risking damage to the cassette structure.

Various embodiments discussed herein may be implemented in different configurations with respect to control systems and sensor placement. The controller and sensors may be integrated within the media cassette itself, within a media depository or recycler, or within the media terminal. The specific placement can be selected based on the particular security requirements and system architecture of the implementation.

As used herein, a 'media terminal' includes a self-service terminal (SST). The SST may include an automated teller machine (ATM), a self-checkout (SCO) terminal that handles cash, or a kiosk that handles cash. The terms and phrases 'cash,' 'media item,' 'media note,' 'bank note,' 'check,' 'bill,' and 'currency item' may be used interchangeably and synonymously herein to refer to valuable media items stored within media cassettes of a media depository or recycler, which is an integrated peripheral of the media terminal.

FIG. 1 is a diagram of a media cassette 100 enabled with media deformation capabilities, according to an example embodiment. Notably, the components are shown schematically in simplified form, with only those components relevant to understanding of the embodiments being illustrated.

Furthermore, the various components (that are identified in media cassette 100) are illustrated and the arrangement of the components are presented for purposes of illustration only. Notably, other arrangements with more or less components are possible without departing from the teachings presented herein and below.

FIG. 1 illustrates a media cassette 100 that includes a housing having a base portion 110 and a lid portion 120. A stack of media items 111 is situated within the base portion 110. The lid portion 120 includes a heating element 121 positioned within the lid structure. A power source 122 is connected to the heating element 121 through connection/interface 123, which extends outside the cassette 100.

The connection/interface 123 enables bidirectional communication between the media cassette 100 and an external controller, such as controller 313 or controller 323 located outside the media cassette housing. Through this interface, the external controller can send activation signals to trigger the heating element 121, while also receiving status information about the power source 122 and heating element conditions. The interface may comprise electrical connections that support both power delivery and digital control signal communication between the media cassette and the external controller.

When the lid portion 120 is in a closed position, the heating element 121 is adjacent to or in close proximity to a surface of the stack of media items 111 stored within the base portion 110.

In an embodiment, the power source 122 comprises a lithium-ion battery with an integrated charging circuit that maintains the battery's charge level. The heating element 121 comprises approximately 40 centimeters of resistive wire material configured to generate heat at or above 120 degrees Celsius when activated.

In an embodiment, the heating element 121 is configured to receive approximately 0.66 volts and 1.94 amps from the power source 122 through connection/interface 123, enabling the heating element to reach approximately 180 degrees Celsius within 4 minutes of activation. This temperature is sufficient to melt and deform polymer-based currency notes while remaining below the kindling point of the cassette materials (e.g., kindling point for the cassette materials is greater than 375 degrees Celsius).

In an embodiment, when the lid portion 120 is in the closed position, the heating element 121 is positioned to affect the top edges of the media items 111, causing them to melt and subsequently fuse together as they cool, rendering them permanently damaged and unusable.

In an embodiment, the heating element 121 comprises one or more small magnesium flash bulbs positioned within the lid portion 120. When activated through interface 123, the flash bulbs provide a rapid, intense burst of heat sufficient to deform the polymer-based media items 111. The one-time use nature of the flash bulbs ensures the deformation process cannot be interrupted or reversed once initiated.

Figure 2:
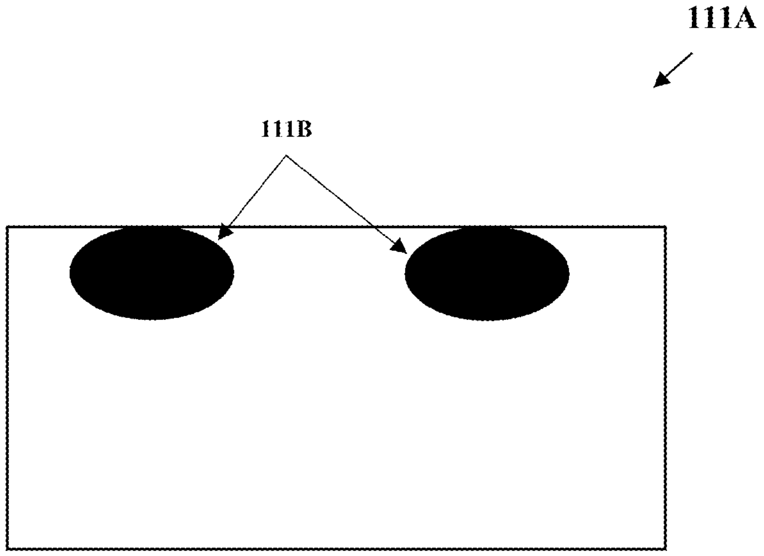
FIG. 2 is diagram of a deformed media item, according to an example embodiment.

FIG. 2 is diagram of a deformed media item 111A, according to an example embodiment. The heating element 121 when activated upon detection of an unauthorized access attempt to the media terminal 310 causes a surface of media item 111A to melt or sear result in stains 111B visible on the media item 111A. The unauthorized access may be detected by one or more sensors of the media terminal 310, the secure enclosure or safe of the media terminal which houses the media cassette 100, or the media cassette 100 itself.

In an embodiment, the deformation of media item 111A occurs when polymer-based notes reach temperatures above 120 degrees Celsius, causing them to shrink and melt. The resulting stains 111B are permanent and cannot be removed or cleaned using solvents, unlike traditional ink-staining protection systems.

The deformation process is particularly effective with polymer-based currency notes, which begin to shrink when exposed to temperatures above 120 degrees Celsius. The physical deformation caused by the heating process creates permanent structural changes in the polymer material that cannot be reversed, unlike traditional ink-based protection methods that may be defeated with solvents.

The deformation process takes advantage of the material properties of polymer notes, which begin to deform at temperatures significantly lower than the melting point of PC/ABS (polycarbonate/acrylonitrile butadiene styrene) cassette materials (greater than 200 degrees Celsius).

Figure 3:
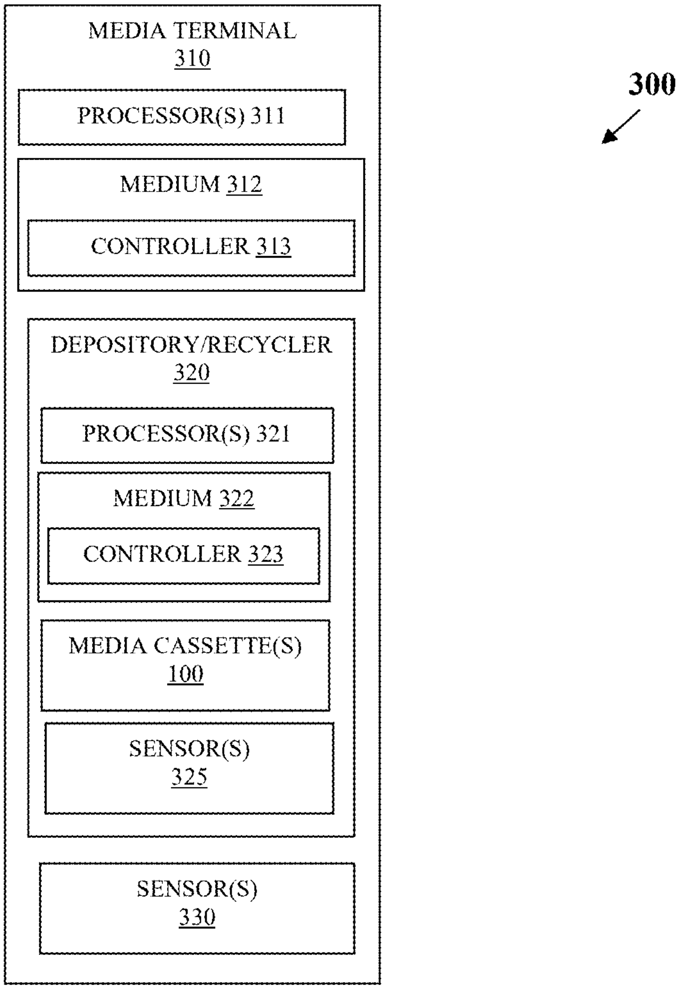
FIG. 3 is diagram of a media deformation system, according to an example embodiment.

FIG. 3 is diagram of a media deformation system 300, according to an example embodiment. Again, the components are shown schematically in simplified form, with only those components relevant to understanding of the embodiments being illustrated.

The system 300 includes a media terminal 310, a depository/recycler 320, and one or more sensors 330. The media terminal 310 includes at least one processor 311 and a non-transitory computer-readable storage medium (medium) 312, which includes instructions for a controller 323. The instructions when executed by the processor 311 cause the processor 311 to perform operations discussed herein with respect to controller 323.

The depository/recycler 320 includes at least one processor 321 and a medium 322, which includes instructions for a controller 323. The instructions when executed by the processor 321 cause the processor 321 to perform operations discussed herein with respect to controller 323. The depository/recycler 320 further includes media cassettes 100 and one or more sensors 325.

The controller 323 includes sophisticated logic to distinguish between authorized and unauthorized access attempts to the secure enclosure. For authorized activities such as routine maintenance, cash replenishment, or servicing operations, the controller recognizes predetermined access patterns and credentials. When unexpected or unauthorized access patterns are detected through sensors 325 and 330, such as forced entry attempts or access outside of scheduled maintenance windows, the controller identifies these as potential security threats and triggers appropriate protective responses including activation of the heating elements 121.

In various embodiments, the media terminal 310 and depository/recycler 320 may be configured with different arrangements of the processors (311, 321) and controllers (313, 323) to process signals from sensors (325, 330). The sensors may be configured to detect motion, force, or vibration indicating potential unauthorized access attempts.

In an embodiment, the media terminal 310 includes an alarm system that interfaces with the controller 323. The alarm system provides secondary triggering signals to the controller 323 when unauthorized access is detected, serving as a redundant detection mechanism alongside the sensors (325, 330). These secondary signals can help validate potential security threats and trigger the activation of heating elements 121 in the affected media cassettes 100.

The depository/recycler 320 includes a secure enclosure or safe that houses the media cassettes 100. The sensors 325 are integrated within this secure enclosure to provide immediate detection of any unauthorized access attempts. The controller 323 is configured to distinguish between expected operations, such as normal servicing, and unexpected access attempts that may indicate a theft attempt.

In an embodiment, when the sensors (325, 330) detect an attack on the terminal or an unauthorized attempt to access the cassettes 100, the controller (313, 323) triggers the activation of the heating elements 121 through their respective interfaces 123. The controller maintains the activation for a predetermined time period sufficient to ensure the media items are permanently deformed.

The heating element activation process is carefully controlled through the interface 123 to ensure optimal deformation results. When triggered, the system provides approximately 0.66 volts and 1.94 amps to the heating element, which comprises approximately 40 centimeters of resistive wire material. This precise electrical configuration enables the heating element to reach its target temperature of 180 degrees Celsius within 4 minutes while maintaining safe operating conditions.

The lithium-ion battery power source 122 is maintained at full charge through an integrated charging circuit, ensuring the system is always ready to respond to unauthorized access attempts. The charging circuit connects to the media terminal's power system through interface 123, providing continuous charging capability while the cassette is installed in the depository/recycler 320.

Sensors 330 and/or sensors 325 are configured to report readings, metrics, or measurements to controller 313 and/or controller 323. The sensors (330, 235) may include motion sensors, vibration sensors, and/or force sensors.

Based on reported readings, controller 313 or controller 323 sends a signal or activates power source 122 via connection or interface 123. When power source 122 is activated, heating element 121 is heated. This occurs when the lid portion 120 to the cassette 100 is closed such that the heating element 121 heats a surface of the bunch or stack of media items 111 causing deformed and unusable media items (e.g., deformed media item 111A).

Figure 4:
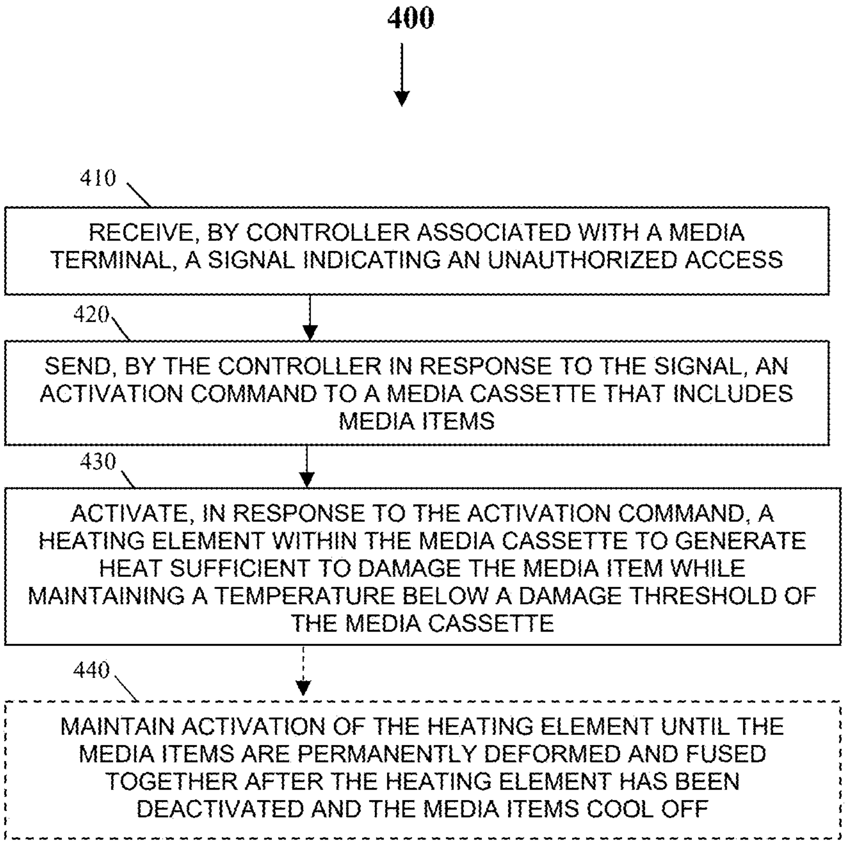
FIG. 4 is a diagram of a flow diagram of a method of deforming media within a media cassette upon detection of an unauthorized media cassette access attempt, according to an example embodiment.

FIG. 4 is a diagram of a flow diagram of a method 400 of deforming media within a media cassette upon detection of an unauthorized media cassette access attempt, according to an example embodiment. The instructions of method 400 are executed by a processor (311, 321) for a media terminal 310 or a depository/recycler 320. In an embodiment, the instructions executed by the processor (311, 312) are controller 313 or controller 323.

At 410, the controller associated with a media terminal 310 receives a signal indicating an unauthorized access has been detected at the media terminal 310. At 420, the controller, in response to the signal, sends an activation command to a media cassette 100 that includes media items 111.

At 430, the controller, in response to the activation command, activates a heating element 121 within the media cassette 100 to generate heat sufficient to damage the media item while maintaining a temperature below a damage threshold of the media cassette 100.

In an embodiment, at 440, the controller maintains activation of the heating element 121 until the media items are permanently deformed and fuse together after the heating element 121 has been deactivated and the media items 111 cool off.

The deformation process, whether achieved through resistive heating or flash heating, creates irreversible changes in the polymer structure of the media items. The controlled application of heat ensures that while the media items are permanently damaged, the temperature remains well below the melting point of the PC/ABS cassette materials (greater than 200 degrees Celsius) and significantly below their kindling point (greater than 375 degrees Celsius), maintaining the structural integrity and safety of the cassette housing.

The controller's activation of the heating element is maintained for a duration sufficient to ensure complete deformation of the media items. As the polymer-based notes are heated above their deformation threshold of 120 degrees Celsius, they begin to melt and fuse together. When the heating element is deactivated and the notes cool, they become permanently bonded, creating an unusable mass of deformed currency that cannot be separated or restored to usable condition.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A media cassette, comprising:

a housing configured to store media items;

a heating element positioned within the housing;

a power source connected to the heating element; and an interface configured to communicate with an external controller, wherein the heating element is configured to activate in response to receiving a signal from the external controller to directly apply heat to the media items sufficient to permanently deform and fuse the media items together upon cooling while maintaining a temperature below a damage threshold of the housing.

2. The media cassette of claim 1, wherein the heating element comprises a resistive wire positioned in a lid portion of the housing, wherein the resistive wire is adjacent to a surface of the media items when the lid portion is in a closed position.

3. The media cassette of claim 1, wherein the power source comprises a lithium-ion battery with a charging circuit.

4. The media cassette of claim 1, wherein the heating element is configured to generate heat at or above 120 degrees Celsius.

5. The media cassette of claim 1, wherein the heating element comprises approximately 40 centimeters of resistive material.

6. The media cassette of claim 1, wherein the heating element is configured to receive approximately 0.66 volts and 1.94 amps.

7. The media cassette of claim 1 wherein the media items comprise polymer-based currency notes.

8. The media cassette of claim 1, wherein the heating element is configured to heat to approximately 180 degrees Celsius within 4 minutes.

9. The media cassette of claim 1, wherein the heating element is configured to melt top edges of the media items.

10. The media cassette of claim 1, wherein the interface comprises electrical connections for receiving power and control signals.

11. The media cassette of claim 1, wherein the heating element is configured to generate heat at a temperature that is less than a kindling point of cassette materials.

12. A media terminal, comprising:

a media depository or a media recycler comprising a secure enclosure having at least one media cassette;

at least one sensor configured to detect an unauthorized access to the secure enclosure;

a controller configured to process signals from the at least one sensor;

each media cassette comprising:

a housing configured to store media items;

a heating element positioned within the housing;

a power source connected to the heating element; and an interface configured to communicate; and wherein the controller is configured to send an activation signal to each media cassette through the interface in response to detection of the unauthorized access;

wherein the heating element is configured to generate sufficient heat in response to the activation signal to directly apply heat to the media items sufficient to permanently deform and fuse the media items together upon cooling while maintaining a temperature below a damage threshold of the housing.

13. The media terminal of claim 12, wherein the at least one sensor comprises at least one of a motion sensor, force sensor, or vibration sensor integrated within the secure enclosure.

14. The media terminal of claim 13, wherein the controller is integrated within the media depository or the media recycler.

15. The media terminal of claim 12, further comprising an alarm system configured to provide secondary triggering signals to the controller.

16. The media terminal of claim 12, wherein the controller is configured to distinguish between authorized and unauthorized access attempts.

17. The media terminal of claim 12, wherein the secure enclosure comprises a safe with integrated access detection sensors.

18. The media terminal of claim 12, wherein the controller is configured to maintain activation of the heating element for a predetermined time period.

19. A method, comprising:

receiving, by a controller associated with a media terminal, a signal indicating an unauthorized access;

sending, by the controller in response to the signal, an activation command to a media cassette that includes media items; and directly applying heat, via activation of a heating element within the media cassette in response to the activation command, to the media items sufficient to permanently deform and fuse the media items together upon cooling while maintaining a temperature below a damage threshold of the media cassette.

20. The method of claim 19, further comprising maintaining activation of the heating element until the media items are permanently deformed and fused together after the heating element has been deactivated and the media items cool off.

* * * * *